United States Patent [19]

Ide

[11] Patent Number: 5,081,881
[45] Date of Patent: Jan. 21, 1992

[54] FLUID FILLED ELASTOMERIC DAMPING DEVICE

[75] Inventor: Takanobu Ide, Isehara, Japan

[73] Assignee: Nissan Motor Company, Ltd., Japan

[21] Appl. No.: 600,883

[22] Filed: Oct. 22, 1990

Related U.S. Application Data

[62] Division of Ser. No. 352,382, May 15, 1989, Pat. No. 5,007,304.

[30] Foreign Application Priority Data

May 18, 1988 [JP] Japan .................................. 63-65414

[51] Int. Cl.⁵ ..................... F16F 15/10; F16F 15/22; G05G 1/00
[52] U.S. Cl. .................................. 74/573 F; 74/574; 74/572
[58] Field of Search ................... 74/572–574; 464/180, 182, 89

[56] References Cited

U.S. PATENT DOCUMENTS

| | | | |
|---|---|---|---|
| 4,003,265 | 1/1977 | Craig et al. ........................ | 74/573 R |
| 4,690,389 | 9/1987 | West ................................... | 74/574 |
| 4,793,455 | 12/1988 | Tabuchi et al. ..................... | 464/89 X |
| 4,794,938 | 1/1989 | Iwai et al. ........................... | 74/574 X |
| 4,825,718 | 5/1989 | Seifert et al. ....................... | 74/574 |
| 4,873,887 | 10/1983 | Andra et al. ........................ | 74/573 X |
| 4,873,888 | 10/1983 | Matsuyama ....................... | 188/378 X |
| 4,913,267 | 4/1990 | Campbell et al. .................. | 74/573 F |
| 4,914,943 | 4/1990 | Andra et al. ........................ | 464/87 X |

FOREIGN PATENT DOCUMENTS

| | | | |
|---|---|---|---|
| 0266479 | 5/1988 | European Pat. Off. .............. | 74/574 |
| 3529199 | 2/1986 | Fed. Rep. of Germany .... | 74/573 F |
| 3716441 | 4/1988 | Fed. Rep. of Germany .... | 74/573 F |
| 1295476 | 5/1962 | France ................................. | 74/574 |
| 0172650 | 7/1989 | Japan ................................... | 74/574 |
| 1425383 | 9/1988 | U.S.S.R. .............................. | 74/574 |
| 2018392 | 10/1979 | United Kingdom .............. | 74/573 F |
| 2192968 | 1/1988 | United Kingdom .............. | 74/573 F |

OTHER PUBLICATIONS

Pat Abstracts of Japan, vol. 10, #267 (M-516) 2323 9-11-86.
Pat Abstracts of Japan, vol. 12, #83, (M-677) 2930 3-16-88.
Pat Abstracts of Japan, vol. 11, #105 (M-577) 2552 4-3-87.

Primary Examiner—Vinh T. Luong
Attorney, Agent, or Firm—Lowe, Price, LeBlanc & Becker

[57] ABSTRACT

A restrictive fluid passageway is defined between an outer sleeve and a bracket to provide fluid communication between a working chamber and a compensation chamber or two compensation chambers. In one embodiment, two compensating chambers are arranged outside of the outer sleeve. In another embodiment, one compensation chamber is arranged within the outer sleeve, and the outer sleeve is constituted by axially separated three sections, i.e., first and second sleeve sections and a spacer section interposed between the first and second sleeve sections. A resilient deformable member and flexible wall member has a pair of axially spaced sealing lips projecting outward from an outer circumferential surface. The sealing lips are interposed between matched ends of the first and second sleeve sections and the spacer section and sealingly contact an inner circumferential surface of the bracket.

6 Claims, 3 Drawing Sheets

FLUID FILLED ELASTOMERIC DAMPING DEVICE

This is a division of application Ser. No. 07/352,382, now U.S. Pat. No. 5,007,304, issued Apr. 16, 1991.

BACKGROUND OF THE INVENTION

1. Field of the Invention

The present invention relates to a fluid filled elastomeric dampening device for effectively preventing or reducing the transfer of shock and vibration therethrough and more particularly to a fluid filled elastomeric damping device of the type including inner and outer sleeves connected together by an elastomeric member bounding a fluid chamber.

2. Description of the Prior Art

A fluid filled damping device of the above described kind is well known in the art and is used for mounting an engine, transmission, etc. on an automotive vehicle body as disclosed in U.K. Patent Application No. 8715705 (Ser. No. 2,192,968). The damping device has an orifice or restrictive fluid passageway interconnecting two fluid filled chambers for shock dampening upon deformation of an elastomeric member.

With a view to reducing the number of constitutent parts of the damping device, it is proposed to form the restrictive fluid passageway between an outer sleeve and a bracket by a groove in the bracket as disclosed in U.S. Pat. No. 4,690,389. The outer sleeve is formed with openings through which a fluid filled working chamber and compensation chamber are communicated with each other.

Based on the arrangement in which the restrictive fluid passageway is formed outside of the outer sleeve, various improvements can be attained with a view to improving the durability of the damping device and reducing the manufacturing and assembling expense.

SUMMARY OF THE INVENTION

In accordance with the present invention, there is proposed an elastomeric damping device which comprises concentric rigid inner and outer sleeves having a space therebetween, a resilient member within the space connecting the inner and outer sleeves together and thereby subdividing the space into two pockets, a working chamber in one of the pockets enclosed between the resilient member and the outer sleeve, the working chamber containing a fluid, a generally tubular bracket fitted on the outer sleeve, a flexible wall member outside of the bracket, a compensation chamber outside of the outer sleeve, bounded in part by the flexible wall member, and a passageway defined between the bracket and the outer sleeve and communicating with the working chamber and the compensation chamber to provide fluid communication therebetween.

The above structure is effective for improving the durability and reducing the manufacturing and assembling expense.

It is accordingly an object of the present invention to provide a fluid filled elastomeric damping device of the type having an outer sleeve outside a fluid passageway for providing communication between a working chamber and a compensation chamber, which can improve the durability.

It is a further object of the present invention to provide a fluid filled elastomeric damping device of the above described kind, which can reduce the manufacturing and assembling expense.

DESCRIPTION OF THE PREFERRED EMBODIMENTS

Figure 1:
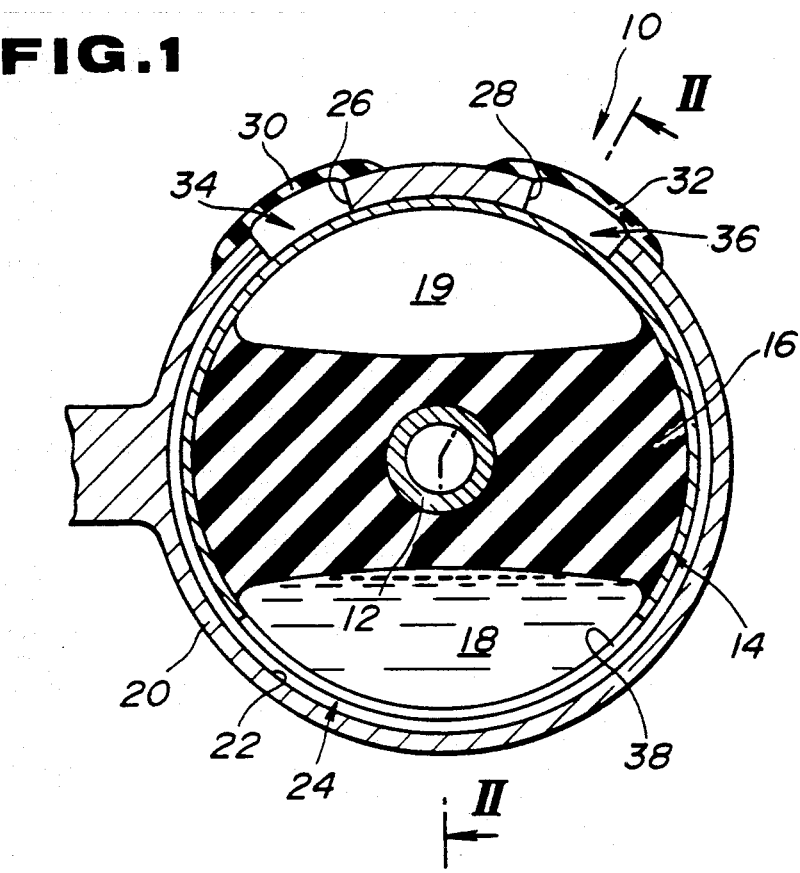
FIG. 1 is a sectional view of a fluid filled elastomeric damping device according to an embodiment of the present invention.
Figure 2:
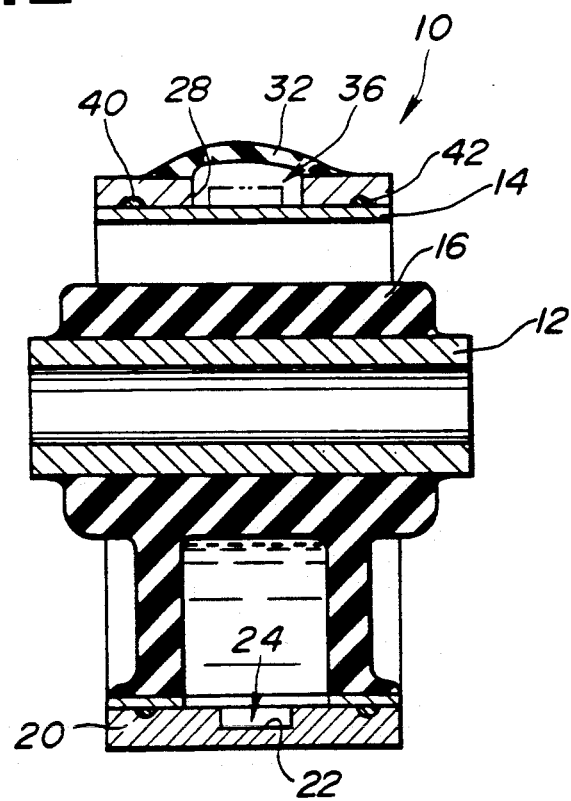
FIG. 2 is a sectional view taken along the line II—II of FIG. 1.

Referring to FIGS. 1 and 2, a fluid filled elastomeric damping device according to an embodiment of the present invention is generally indicated by 10 and includes concentric rigid inner and outer sleeves 12 and 14 and an elastomeric member or resilient deformable member 16 disposed between the inner and outer sleeves 12 and 14 to interconnect the same.

The resilient deformable member 16 is molded from a resilient material such as rubber and bonded to the outer circumferential surface of the inner sleeve 12 and the inner circumferential surface of the outer sleeve 14 by sulfurization. The resilient deformable member 16 bounds on one side thereof, i.e., on the lower side in the drawings, a working chamber 18 filled with hydraulic fluid and on the other side, i.e., on the upper side thereof in the drawings, an atmospheric chamber 19 communicating with the atmosphere. In other words, the resilient deformable member 16 is disposed in the space between the inner and outer sleeves 12 and 14 to subdivide the space into two pockets. The working chamber 18 is arranged in one of the pockets and enclosed between or bounded by the resilient deformable member 16 and the outer sleeve 14. The atmospheric chamber 19 is arranged in the other of the pockets.

The outer sleeve 14 is fitted in a generally tubular bracket 20 together with the inner sleeve 12 and resilient deformable member 16. The bracket 20 is formed with a circumferential groove 22 in the inner circumferential surface thereof to define a restrictive fluid passageway 24 between the inner circumferential surface of the bracket 20 and the outer circumferential surface of the outer sleeve 14 by the groove 22 in the inner circumferential surface of the bracket 20.

The bracket 20 is formed with two radial openings 26 and 28 which are spaced circumferentially of the bracket 20 from each other. Two flexible wall members 30 and 32 made of a resilient material such as rubber are provided which are bonded by sulfurization to the outer circumferential surface of the bracket 20 to close or bound one of the axial ends of the openings 26 and 28. The other axial ends of the openings 26 and 28 are bounded by the outer circumferential surface of the outer sleeve 14 so as to define two compensation chambers 34 and 36. The compensation chambers 34 and 36 are filled with hydraulic fluid and respectively communicate with the working chamber 18 through the restrictive fluid passage 24 and through an opening 38 formed in the outer sleeve 14. Two seal rings 40 and 42 are provided which are interposed between the outer circumferential surface of the outer sleeve 14 and the inner circumferential surface of the bracket 20 to provide a seal therebetween for thereby sealing the working chamber 18, passageway 24 and compensating chambers 34 and 36.

In use, the damping device 10 is installed on a vehicle body at the bracket 20 or the inner sleeve 12 to support a power unit or the like at the inner sleeve 12 or the bracket 20. When a vibration is applied to the damping device 10 to cause a change in volume of the working chamber 18, hydraulic fluid moves out of the working chamber 18 to the compensating chambers 34 and 36 through the passageway 24. The viscosity of the hydraulic fluid and the constriction effect of the passageway 24 cause a strong damping force to be exerted on the vibration between the inner and outer sleeves 12 and 14. By this, the damping device 10 can effectively absorb vibrations of low frequencies.

From the foregoing, it will be understood that the above damping device has a better durability as compared with a prior art arrangement in which a flexible wall member bounding a compensation chamber is disposed within an outer sleeve. In case of such a prior art arrangement, the flexible wall is liable to contact or interfere with a resilient deformable member bounding a working chamber and be damaged upon large deformation of the resilient deformable member to result in poor durability of the damping device. In the arrangement of this invention, the compensation chambers 34 and 36 are arranged outside of the outer sleeve 14 so that the flexible wall members 30 and 32 can be arranged outside of the outer sleeve 14 and be assuredly prevented from interfering with the resilient deformable member 16.

Figure 3:
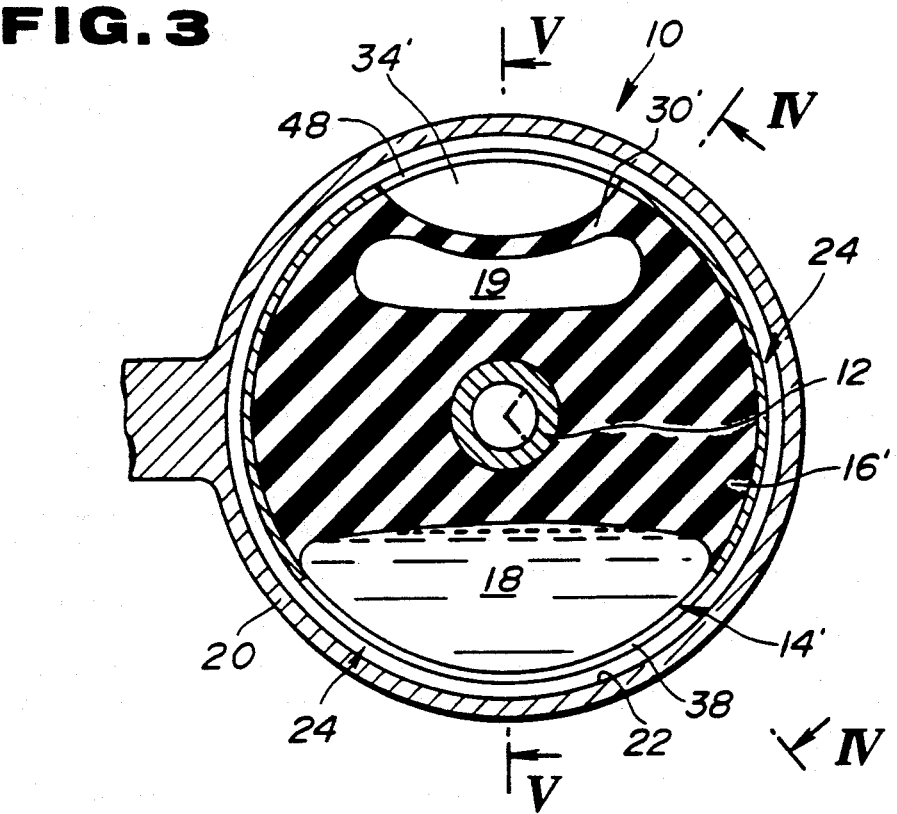
FIG. 3 is a view similar to FIG. 1 but shows another embodiment of the present invention.
Figure 4:
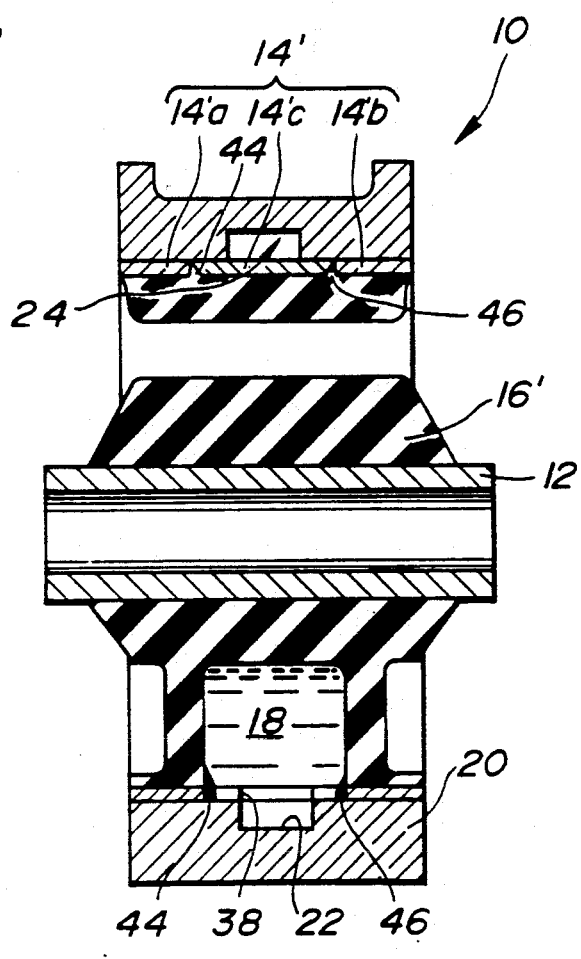
FIGS. 4 and 5 are sectional views taken along the lines IV—IV and V—V of FIG. 3, respectively.
Figure 5:
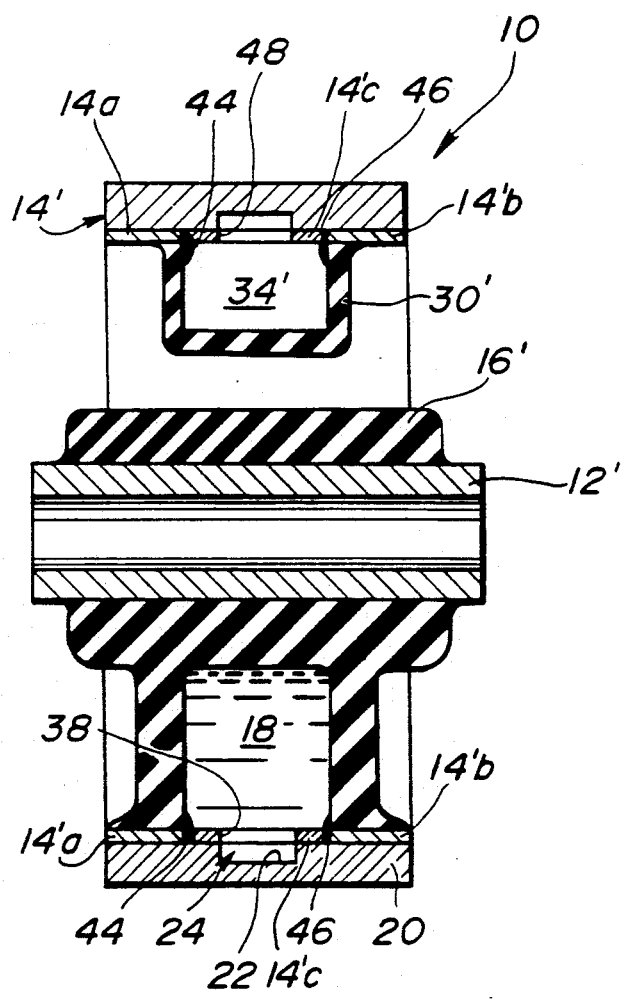

FIGS. 3 to 5 show another embodiment which is directed to an improvement in the outer sleeve 14'. In this embodiment, the outer sleeve 14' consists of three axially separate sections, i.e., first and second sleeve sections 14'a and 14'b and a spacer section 14'c interposed between the sleeve sections 14'a and 14'b. A single compensation chamber 34' is bounded by one side of a flexible wall member 30' integral with the resilient deformable member 16' and the outer sleeve 14'. The other side of the flexible wall 30' member is in contact with the atmospheric chamber 19 in communication with the atmosphere. In other words, the flexible wall member 30' is disposed in the other of the pockets subdivided by the resilient deformable member 16'. The compensation chamber 34' is enclosed between the flexible wall member 30' and the outer sleeve 14'. The atmospheric chamber 19 is bounded by the resilient deformable member 16' and the flexible wall member 30' so as to be out of contact with the inner circumferential surfaces of the first and second sleeve sections 14'a and 14'b and the spacer section 14'c.

A single piece of the resilient deformable member 16' and flexible wall 30' is bonded to the inner circumferential surfaces of the sleeve sections 14'a and 14'b by sulfurization. In this connection, the resilient deformable member 16' is so shaped as to have a pair of axially spaced annular sealing lips 44 and 46 projecting outward from the outer circumferential surface thereof.

The spacer section 14'c is in the form of a split ring and is formed with the opening 38 through which the working chamber 18 communicates with the passageway 24. The spacer section 14'c is further formed with an opening 48 through which the passage 24 communicates with the compensation chamber 34'. More specifically, a blank for the spacer section 14'c is formed from a flat plate. The flat blank is then formed with the opening 48 and rolled or otherwise formed into a split ring.

In assembly, the spacer section 14'c is placed around the resilient deformable member 16' and flexible wall member 30' by being stretched so that the resilient deformable member 16' and flexible wall member 30' pass through the separated ends of the spacer section 14'c. In this instance, the annular sealing lips 44 and 46 are placed between the matched axial ends of the sleeve sections 14'a and 14'b and the spacer section 14'c. The outer sleeve 14' is fitted in the bracket 20 together with the inner sleeve 12 and the resilient deformable member 16' and flexible wall member 30', allowing the sealing lips 44 and 46 to sealingly contact the inner circumferential surface of the bracket 20.

Except for the above, this embodiment is substantially similar to the previous embodiment of FIGS. 1 and 2.

In the foregoing, it is to be noted that each of the sealing lips 44 and 46 of the resilient deformable member 16' and the flexible wall member 30' provides a seal between the outer circumferential surface of the resilient member 16' and the resilient wall member 30' and the inner circumferential surface of the bracket 20 for thereby sealing the working chamber 18, compensating chamber 30' and the passageway 24 all together. In this connection, it will be understood that the atmospheric chamber 19 is fluidly separated from the inner circumferential surface of the spacer section 14'c by circumferential wall portions of the resilient deformable member 16' and flexible wall member 30' as well as the sealing lips 44 and 46.

It is further to be noted that the spacer section 14'c makes it easier to form the opening 48 in the outer sleeve 14.

It is still further to be noted that the spacer section 14'c is useful for easy and assured installation of the sleeve sections 14'a and 14'b in the bracket 20.

What is claimed is:

1. An elastomeric damping device comprising:
    concentric rigid inner and outer sleeves having a space therebetween;
    a resilient member within said space connecting said inner and outer sleeves together and thereby subdividing said space into two pockets;
    a working chamber in one of said pockets enclosed between said resilient member and said outer sleeve, said working chamber containing a fluid;
    a generally tubular bracket fitted on said outer sleeve;
    a first flexible wall member outside of said bracket;
    a first compensation chamber outside of said outer sleeve, bounded in part by said flexible wall member; and
    a first passageway defined between said bracket and said outer sleeve and communicating said working chamber and said first compensation chamber to provide fluid communication therebetween.

2. The damping device according to claim 1 wherein said first compensation chamber is constituted in part by a radial opening formed in said bracket.

3. The damping device according to claim 1 wherein said first compensation chamber is defined in part by said outer sleeve.

4. The damping device according to claim 3 wherein said first compensation chamber is located nearer the other of said pockets.

5. The damping device according to claim 3, further comprising a second flexible wall member outside of said bracket, a second compensation chamber outside of said outer sleeve bounded in part by said second flexible wall member, and a second passageway defined between said bracket and said outer sleeve and communicating said working chamber and said second compensation chamber to provide fluid communication therebetween.

6. The damping device according to claim 1 wherein said passageway is constituted in part by a groove formed in an inner circumferential surface of said bracket and bounded by an outer circumferential surface of said outer sleeve, and said outer sleeve is formed with an opening for providing fluid communication between said working chamber and said passageway.

* * * * *